(12) United States Patent
Grandmougin et al.

(10) Patent No.: US 12,556,529 B1
(45) Date of Patent: Feb. 17, 2026

(54) SECURE PROVISIONING OF AN EDGE DEVICE USING A FIDUCICAL MARKER

(71) Applicant: Amazon Technologies, Inc., Seattle, WA (US)

(72) Inventors: Thibaut Pierre Grandmougin, London (GB); Graham Robert Smith, Trowbridge (GB); Nimay Bharat Mehta, London (GB)

(73) Assignee: Amazon Technologies, Inc., Seattle, WA (US)

( * ) Notice: Subject to any disclaimer, the term of this patent is extended or adjusted under 35 U.S.C. 154(b) by 327 days.

(21) Appl. No.: 18/194,541

(22) Filed: Mar. 31, 2023

(51) Int. Cl.
- *H04L 9/00* (2022.01)
- *G06F 8/61* (2018.01)
- *H04L 9/40* (2022.01)

(52) U.S. Cl.
CPC ............ *H04L 63/0823* (2013.01); *G06F 8/61* (2013.01)

(58) Field of Classification Search
CPC ...... H04L 63/083; H04L 63/0823; G06F 8/61
USPC ......................................................... 726/4–6
See application file for complete search history.

(56) References Cited

U.S. PATENT DOCUMENTS

| | | | |
|---|---|---|---|
| 6,934,838 B1 * | 8/2005 | Boyce | H04L 63/0823 713/168 |
| 10,620,855 B2 * | 4/2020 | Marripudi | H04L 63/0823 |
| 11,099,402 B2 * | 8/2021 | Amadio | H04L 67/131 |
| 2011/0234829 A1 * | 9/2011 | Gagvani | H04N 23/60 348/222.1 |
| 2014/0062874 A1 * | 3/2014 | Suggs | G06F 3/0481 345/158 |
| 2019/0250899 A1 | 8/2019 | Reidl et al. | |
| 2021/0364811 A1 | 11/2021 | Amadio | |
| 2023/0115286 A1 * | 4/2023 | Crofts | H04L 63/08 726/6 |
| 2024/0363206 A1 * | 10/2024 | Mayer | G16H 20/10 |

* cited by examiner

*Primary Examiner* — Bharat Barot
(74) *Attorney, Agent, or Firm* — Robert C. Kowert; Kowert, Hood, Munyon, Rankin & Goetzel, P.C.

(57) ABSTRACT

An update deployment service performs secure provisioning of an edge device using a fiducial marker. A client registers an edge device with a provisioning service of a remote service provider network by providing a unique device ID. When the edge device is turned on, the edge device detects, based on input from a camera of the device, a fiducial marker that was generated by the provisioning service. The edge device decodes a network address (URL) and security credentials represented by the fiducial marker. The edge device sends the device ID and credentials to the provisioning service. The provisioning service authenticates the credentials and sends, to the edge device, a client certificate that can be used by the edge device for authentication by one or more other services of the provider network.

20 Claims, 6 Drawing Sheets

SECURE PROVISIONING OF AN EDGE DEVICE USING A FIDUCICAL MARKER

BACKGROUND

The Internet of Things (IoT) is a phrase given for the interconnection of computing devices scattered around the globe within the existing internet infrastructure. A client of a remote service provider may use IoT devices (also referred to herein as edge devices) to collect data (e.g., video data, sensor measurements) and to send the data to the service provider for processing by one or more services of the service provider's network. In order to provision an edge device to securely communicate with a service of the service provider's network, a user may be required to perform many different tasks (download software from the service provider, install software on the edge device, obtain a client certificate for the edge device, etc.). Provisioning an edge device may consume a large amount of human resources as well as various communication resources. The provisioning process can be quite burdensome, error-prone, and time-consuming, particularly for clients that use large numbers of IoT devices.

Figure 1:
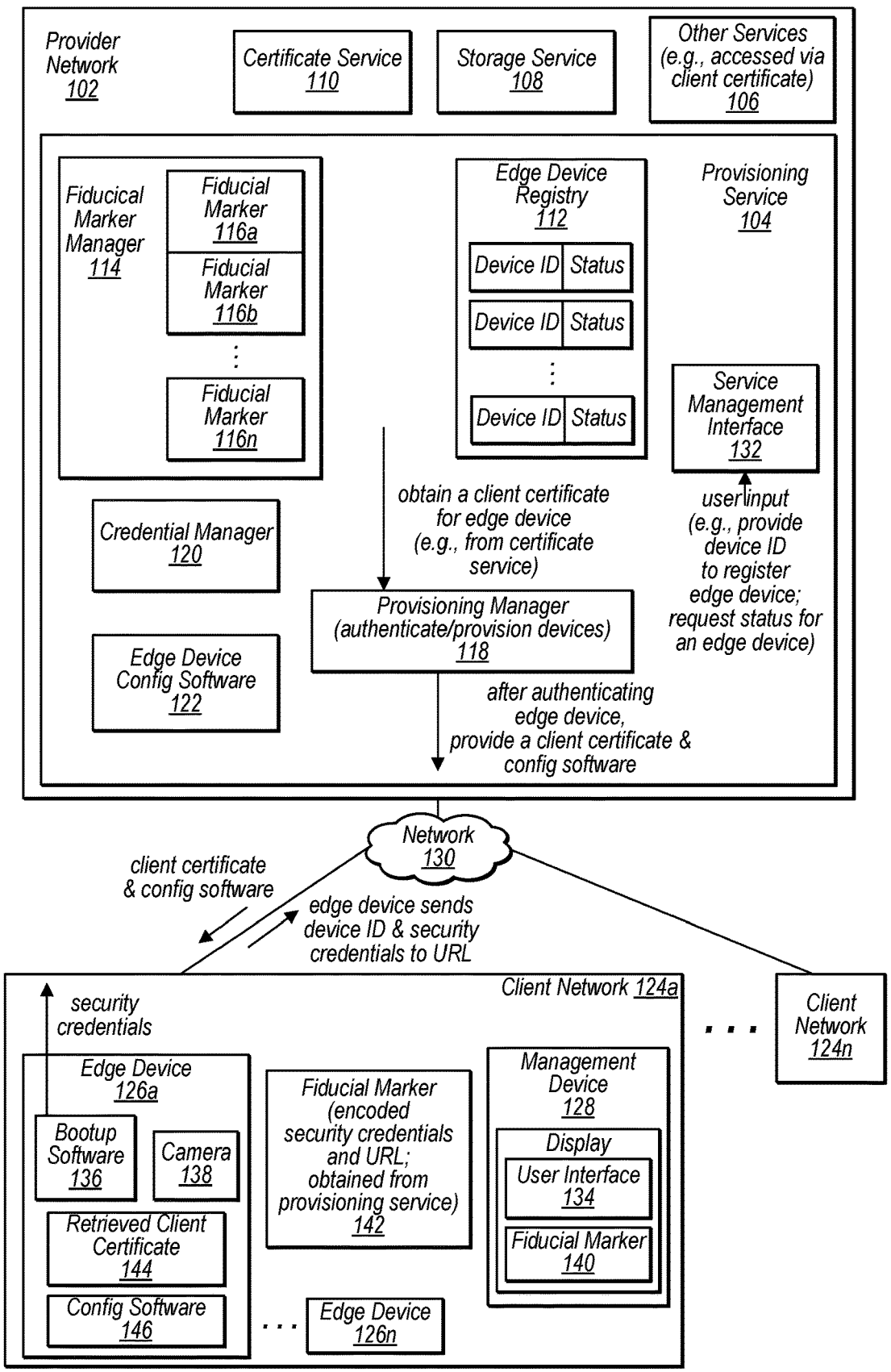
FIG. 1 is a logical block diagram illustrating a system for secure provisioning of an edge device using a fiducial marker, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments for secure provisioning of an edge device using a fiducial marker, according to some embodiments. In embodiments, a provisioning service of a service provider network may be used by any number of different clients (e.g., businesses, organizations, or other customers of the service provider network) to automatically provision any number of edge devices for each client. Securely provisioning an edge device using fiducial markers, as described herein, may be less burdensome, error-prone, and/or time-consuming than securely provisioning edge devices using traditional techniques. Furthermore, fewer human resources and/or communication/computing resources may be used to provision an edge device, compared to traditional techniques.

In embodiments, an edge device may be registered with a provisioning service before the edge device is provisioned and/or turned on by a client. As part of registering the edge device, a unique identifier (ID) of the edge device may be stored by the service. For example, the service may receive, from a user at a location of the client, user input that includes a device identifier (ID) for the edge device to be used at a remote network of the client with one or more services of the provider network. The service may then register the edge device, which may include storing the device ID of the edge device. In some embodiments, the service may automatically register the edge device in response to a user of the client purchasing the edge device (e.g., a purchase via a website of the service provider or another vendor).

In some embodiments, the user may register new devices using a cloud-based console, where the user provides information that is saved as part of the registration process (e.g., device ID, name, local network information). In various embodiments, as part of the registration process, backend services of the provider network may generate user-specific and/or edge device-specific artifacts (such as a device certificate for the edge device). In an embodiment, a fiducial marker may be returned to the user, such as a QR code that embeds one-off credentials and a one-off uniform resource locator (URL) pointing to the previously generated artifacts.

At some point in time after the edge device has been registered, the client may initiate the automatic provisioning process. For example, a user at a location of the client may turn on (e.g., boot up) an edge device, causing the edge device to execute bootup software. The bootup software may cause the edge device to enter a "claim" mode. Therefore, the edge device may be pre-configured to boot in a claim mode during which the device's camera is active and a computer vision algorithm continuously monitors the video stream to detect a fiducial marker.

In an embodiment, the user may move the fiducial marker in front of the camera in order to initiate the claim process and provision the edge device. In embodiments, the edge device may identify the fiducial marker and decode a URL as well as temporary credentials. As described herein, the edge device may then send credentials to the URL to be authenticated and to retrieve artifacts (e.g., client certificate). In an embodiment, the client certificate may be generated in response to authenticating the credentials (e.g., generated on-the-fly), and then provided to the edge device.

At a later point, the edge device may then use the client certificate to establish a secure connection with any number of other services of the service provider network. In some embodiments, if the edge device cannot reach the decoded URL, no action may be taken (the device may re-try at a later time).

In various embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 6 and described below.

This specification begins with a description of a system for secure provisioning of an edge device using a fiducial marker. A number of different methods and techniques for secure provisioning of an edge device using a fiducial marker are discussed, some of which are illustrated in accompanying flowcharts. Finally, a description of an example computing system upon which the various components, modules, systems, and/or techniques described herein may be implemented is provided. Various examples are provided throughout the specification.

FIG. 1 is a logical block diagram illustrating a system for secure provisioning of an edge device using a fiducial marker, according to some embodiments.

As shown, a provider network 102 includes a provisioning service 104 that implements secure provisioning of an edge device using a fiducial marker. In the example embodiment, the provider network 102 also includes any number of other services 106, such as compute services and/or storage services.

In embodiments, any of the compute and/or storage functionality described for the update deployment service 104 may be provided, at least in part, by one or more of the other services 106 or storage service 108. For example, the storage service 108 may maintain an edge device registry and/or a database of fiducial markers for each client of the provisioning service 104. As discussed herein, the certificate service 110 may also be used by the provisioning service, in some embodiments.

In the depicted embodiment, the provisioning service 104 includes an edge device registry 112 that stores data for any number of edge devices of each client of the service. The data may include a device ID for each edge device that uniquely identifies each edge device at least with respect to other edge devices of a given client. As shown, the device registry also stores a status for each device, described below.

The provisioning service 104 also includes a fiducial marker manager 114 that generates and stores any number of fiducial markers 116a-116n that are used for secure provisioning of edge devices, as described herein. The provisioning service also includes a provisioning manager 118 that performs authentication and provisioning tasks for edge devices, a credential manager 120 that manages credentials encoded in the fiducial markers, and edge device config software 122 that may include different types of configuration software that may be sent to edge devices for configuration of the edge devices to perform any number of actions, such as establishing connections with services at the provider network.

In embodiments, any number of clients of the update deployment service 104 may each have one or more client networks 124, and a given client network may include any number of edge devices 126. For example, client network 124a of a client includes and devices 126a-126n and a management device 128. In embodiments, clients of the update deployment service 104 may use the update deployment service 104 by communicating with the provider network 102 from a remote client network 110 of the corresponding client (e.g., via a wide area network 130, such as the internet).

As depicted, the update deployment service 104 includes a management interface 132 (e.g., a management API) that may receive user input (e.g., data, selections) from a management device 128 of a remote client network 110 (e.g., via a user interface 134 provided by a display of the management device, a command line interface, API commands or requests, etc.). For example, a user may provide input via a graphical user interface or command line interface of the display.

As shown, the management interface 120 may receive user input from the management device management device 128 that includes a device ID of the edge device 126a. Based at least on the device ID, the provisioning service may register the edge device 126a with the provisioning service. Registering the edge device 126a may include adding an entry for the edge device to the edge device registry 112 that includes the device ID and a current status of the device. For example, when the device is first registered, the status may be initialized to indicated that the device is registered.

When the edge device 126a is booted up (e.g., turned on/powered up), bootup software 136 of the device may cause the device to detect, based on input from a camera 138 of the edge device, a fiducial marker. For example, the device may detect a fiducial marker 140 downloaded from the service and displayed by the management device or a fiducial marker 142 printed onto an object/paper that is downloaded/received from the service provider (e.g., one of the fiducial markers 116 generated by the provisioning service). In various embodiments, printed fiducial markers may be received from the service provider or other entity, or a user at the client site may download fiducial markers and print them at the client site. As described herein, the use of a fiducial marker allows edge devices to be provisioned for use with services of the provider network without requiring the use of a provisioning device at the client site and/or manual steps performed by an administrator at the client site.

The edge device 126a may then decode a network address (e.g., URL) and security credentials (e.g., name, ID, and/or password/passcode) represented by the fiducial marker that was detected. The edge device may then provide, to the network address of the remote provider network 102 (e.g., a URL of the provisioning service), the device ID of the edge device and the decoded security credentials.

As mentioned above, the edge device may have already been registered with the provider network prior to the providing of the device identifier to the network address. As described in more detail below, if the edge device is authenticated based on the device ID and the decoded security credentials, then the edge device may receive, from the provider network, a unique client certificate for authentication of the edge device by one or more services of the provider network and/or other data. In some embodiments, the device may be registered by the provisioning service after the device is authenticated based on the device ID and the decoded security credentials. For example, in response to authenticating the edge device based on the device ID and the decoded security credentials, the service may add an entry for the device to the edge device registry 112 (e.g., the device ID and/or status).

In the depicted example, the provisioning manager 118 may receive, at the network address from the edge device 126a, the device ID and the decoded security credentials that were encoded in the fiducial marker (e.g., fiducial marker 140 or 142 that is also stored by the fiducial marker manager 114). The provisioning manager 118 may then authenticate the edge device based on the decoded security credentials. For example, the credential manager 120 may determine that the credentials are valid.

In response to the authentication of the edge device, the provisioning manager 118 may provide, to the edge device 126a, a unique client certificate 144 for authentication of the edge device by one or more services of the provider network and/or config software 146. In embodiments, the configuration software may be installed onto the edge device by the edge device in order for the edge device to be able to connect to one or more services of the provider network (e.g., other services 106). In some embodiments, the configuration software may include a network address of each of the one or more services that the edge device may use to establish a connection.

In order to provide the unique client certificate 144, in some embodiments the provisioning service may use a different service to obtain the certificate. For example, in response to authentication of the edge device using the credentials, the provisioning service may provide, to an endpoint (e.g., certificate service 110), a request for the unique client certificate for the edge device. The provisioning service may then receive, from the endpoint, the unique client certificate. The client certificate may then be provided to the edge device.

In various embodiments, the provisioning service may expire the security credentials after they have been used or if they have not been used for an amount of time. In embodiments, subsequent to the authentication of the edge device based on the decoded security credentials, the service expires the security credentials so that they cannot be used again (e.g., one time use). In some embodiments, in response to a determination by the provisioning service (e.g., credential manager) that the security credentials have not been used for a threshold amount of time (e.g., an amount of time after generation or storage of the fiducial marker that encodes the security credentials), the provisioning service expires the security credentials.

In embodiments, the provisioning service may prevent the same fiducial marker and/or the same security credentials from being used twice. For example, the service may receive, from another edge device of the client, another device ID of the other edge device and the same decoded security credentials that were already used by the edge device discussed above. In response to determining that the decoded security credentials are expired, the provisioning service may prevent authentication of the other edge device. In some embodiments, the decoded URL may only be used once (e.g., the URL may be expired after it is accessed by an edge device). Therefore, an edge device may be unable to connect to a URL from a fiducial marker that has already been used by another edge device to be provisioned.

In some embodiments, the status of an edge device (e.g., stored by the edge device registry) may be updated at different points in time to reflect the current stage of the provisioning process for an edge device. For example, the provisioning service may receive, from the client (e.g., via the management interface) a request for a status of the edge device and in response to receiving the request, the provisioning service may provide, to the client, one or more of: an indication that the edge device has established a connection with the provider network; an indication that the edge device is being provisioned for use with the one or more services; or an indication that the edge device has completed provisioning for use with the one or more services of the provider network.

Figure 2:
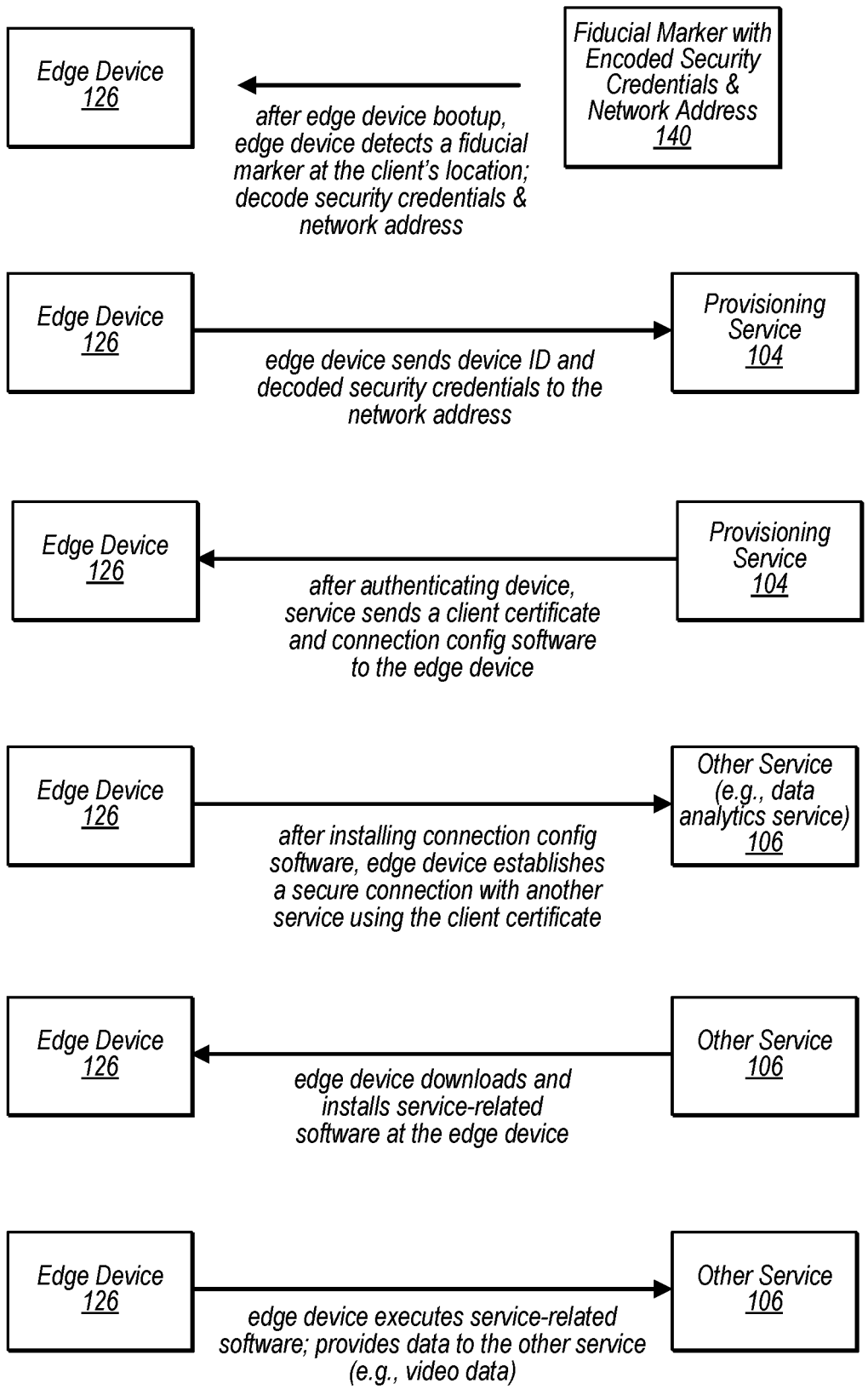
FIG. 2 is a flow diagram illustrating secure provisioning of an edge device using a fiducial marker, according to some embodiments.

FIG. 2 is a flow diagram illustrating secure provisioning of an edge device using a fiducial marker, according to some embodiments.

In the depicted example, after an edge device 126 boots up, the edge device detects a fiducial marker at the client's location (based on input from a camera of the edge device). In response, the edge device decodes security credentials and a network address from the fiducial marker. In various embodiments, the edge device may decode other data and/or instructions that are encoded in the fiducial marker. For example, the edge device may decode local network credentials, (e.g., local WiFi credentials such as network name and password) to log on to a local network to gain internet access.

In an embodiment, a user may provide the local network credentials during registration of the device, and the fiducial marker is generated for use with edge devices at the client's local network. In some embodiments, the edge device may decode instructions that cause the edge device to prompt the user to enter local network credentials to log on to a local network.

As shown, the edge device may then send the device ID and the decoded security credentials to the network address (e.g., after establishing a connection to the provisioning service via the network address/URL). After the provisioning service authenticates the edge device based on the security credentials, the provisioning service sends a client certificate and connection config software to the edge device. In some embodiments, the connection config software may be data used by the edge device to communicate with another service of the provider network (e.g., a network address/URL of a data analytics service used to establish a connection).

After the edge device installs the connection config software, the edge device establishes a secure connection with the other service of the provider network using the client certificate (e.g., a connection to the data analytics service). The edge device may then download and install service-related software at the edge device (e.g., software that causes the edge device to process collected image/video data from the camera). The edge device may execute the software and provide data to the other service based on the execution (e.g., send the processed image/video data to the data analytics service).

Figure 3:
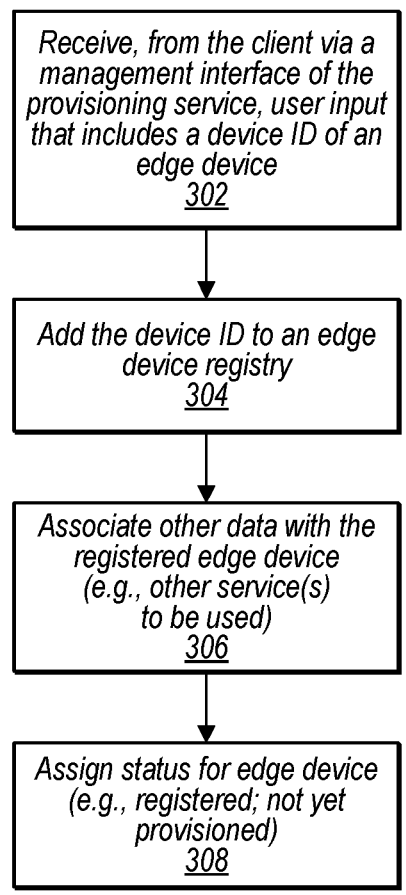
FIG. 3 is a high-level flowchart illustrating various methods and techniques to register an edge device with a provisioning service, according to some embodiments.

FIG. 3 is a high-level flowchart illustrating various methods and techniques to register an edge device with a provisioning service, according to some embodiments. In various embodiments, any of the functionality described for any portions of the flowcharts 3-5 may be performed by any of the components of FIGS. 1-2 and/or 6.

Figure 4:
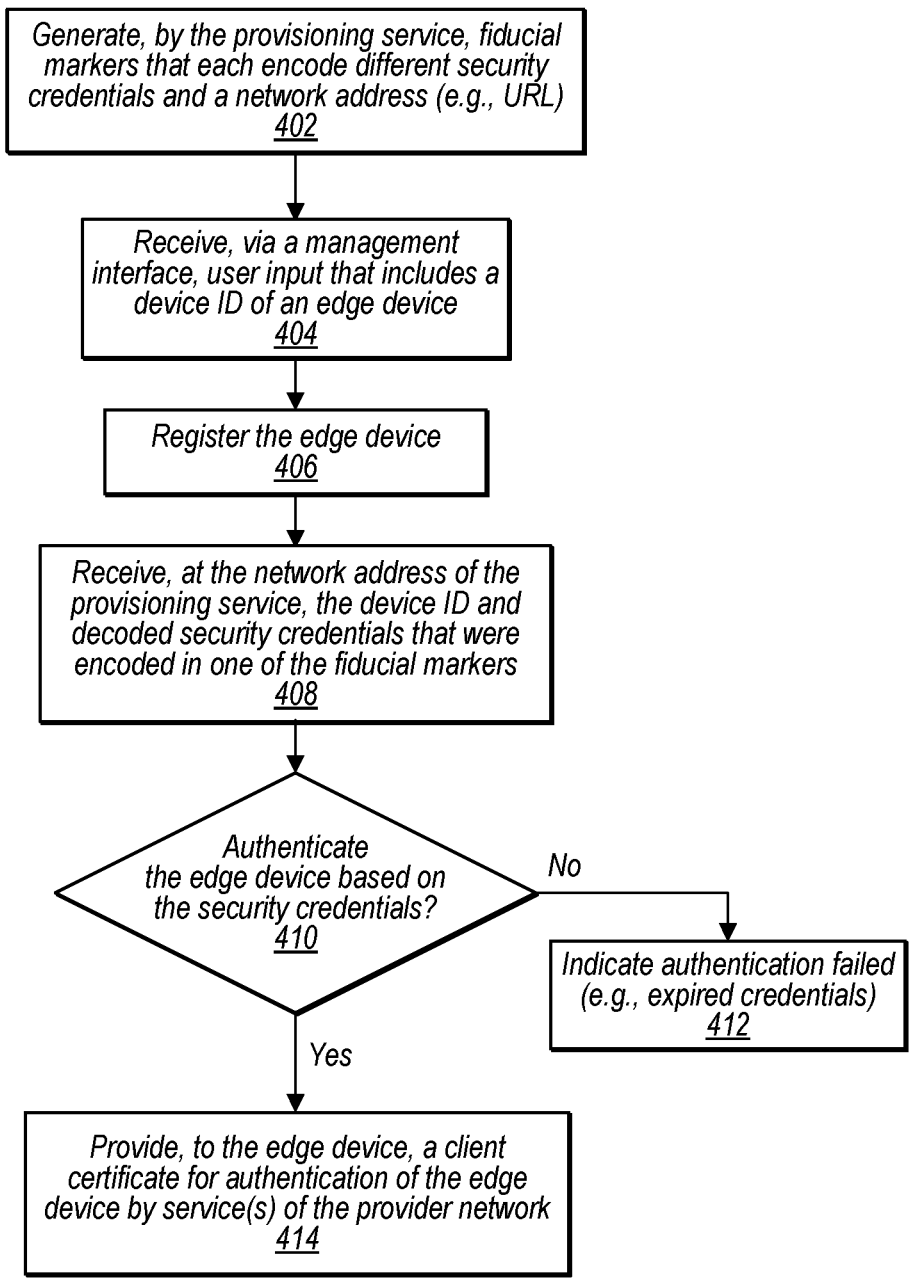
FIG. 4 is a high-level flowchart illustrating various methods and techniques to securely provision an edge device using a fiducial marker, according to some embodiments.
Figure 5:
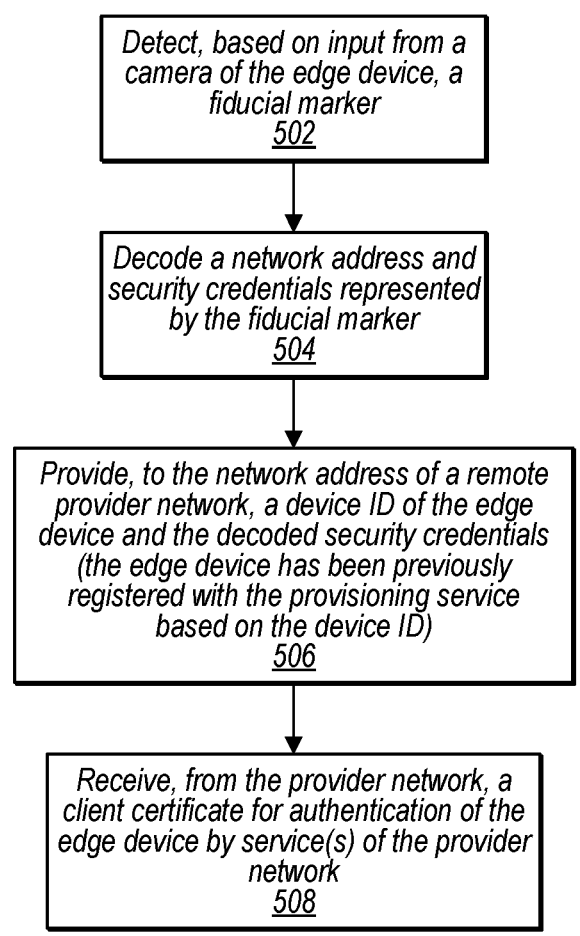
FIG. 5 is a high-level flowchart illustrating various methods and techniques to securely provision an edge device using a fiducial marker, according to some embodiments.

These techniques, as well as the techniques discussed with regard to FIGS. 4 and 5, may be implemented using components or systems as described above with regard to FIGS. 1-2, as well as other types of components or systems, and thus the following discussion is not intended to be limiting as to the other types of systems that may implement the described techniques. For example, any of the techniques may be implemented by an update deployment service of a provider network and/or by a local service/application on one or more computing devices of a client network.

At block 302, the provisioning service receives, from the client via a management interface of the service, user input that includes a device ID of an edge device to be used at the client's local network. In embodiments, the user input may also identify one or more services of the provider network that will be used with the edge device.

At block 304, the provisioning service adds the device ID to an edge device registry. At block 306, the provisioning service associates other data with the registered edge device. For example, the provisioning service may add, to the edge device registry, a list of the other services of the provider network that will be used with the edge device (e.g., associated with the device ID in the registry). The provisioning service may assign a status for the edge device, which may also be stored in the registry associated with the device ID. For example, the status may indicate the edge device is registered and/or not yet provisioned.

FIG. 4 is a high-level flowchart illustrating various methods and techniques to securely provision an edge device using a fiducial marker, according to some embodiments.

At block 402, the provisioning service generates fiducial markers that each encode different security credentials and a network address (e.g., URL). In embodiments, the security credentials may be one-time use and/or temporary credentials that expire if they have not been used for a threshold amount of time (e.g., after being encoded into a fiducial marker during generation of the fiducial marker or after the fiducial marker is provided to the client/client network). At block 404, the provisioning service receives, via a management interface, user input that includes a device ID of an edge device.

At block 406, the provisioning service registers the edge device. At block 408, the provisioning service receives, at the network address of the provisioning service, the device ID and decoded security credentials that were encoded in one of the fiducial markers. In some embodiments, the edge device may re-try connecting to the network address/URL any number of times (e.g., 3 times) if the edge device is unable to connect after an initial attempt. At block 410, the provisioning service determines whether the edge device is authenticated based on the provided security credentials. If not, then at block 412, the service indicates that authentication fails (e.g., sue to the security credentials being expired and/or previously used). If the service determines that the edge device is authenticated based on the credentials, then at block 414, the service provides, to the edge device, a client certificate for authentication of the edge device by service(s) of the provider network.

FIG. 5 is a high-level flowchart illustrating various methods and techniques to securely provision an edge device using a fiducial marker, according to some embodiments.

At block 502, the edge device detects, based on input from a camera of the edge device, a fiducial marker (e.g., a marker displayed on a computer display/monitor or a marker printed on a physical object, such as paper). At block 454, the edge device decodes a network address and security credentials that are represented by the fiducial marker in an encoded form.

At block 506, the edge device provides, to the network address of the remote provider network (e.g., a network address of the provisioning service), a device ID of the edge device and the decoded security credentials (as discussed herein, the edge device has been previously registered, based on user input, with the provisioning service based at least on the device ID). In some embodiments, the edge device may re-try connecting to the network address/URL any number of times (e.g., 3 times) if the edge device is unable to connect after an initial attempt. At block 508, the edge device receives, from the provider network (e.g., from the provisioning service), a client certificate that may be used for authentication of the edge device by any number of services of the provider network (e.g., a data analytics service, a storage service, etc.).

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors.

The program instructions may implement the functionality described herein (e.g., the functionality of the provisioning service, other services, software, edge devices, and any other components/devices that implement the techniques described herein). The various methods as illustrated in the figures and described herein represent example embodiments of methods. The order of any method may be changed, and various elements may be added, reordered, combined, omitted, modified, etc.

Figure 6:
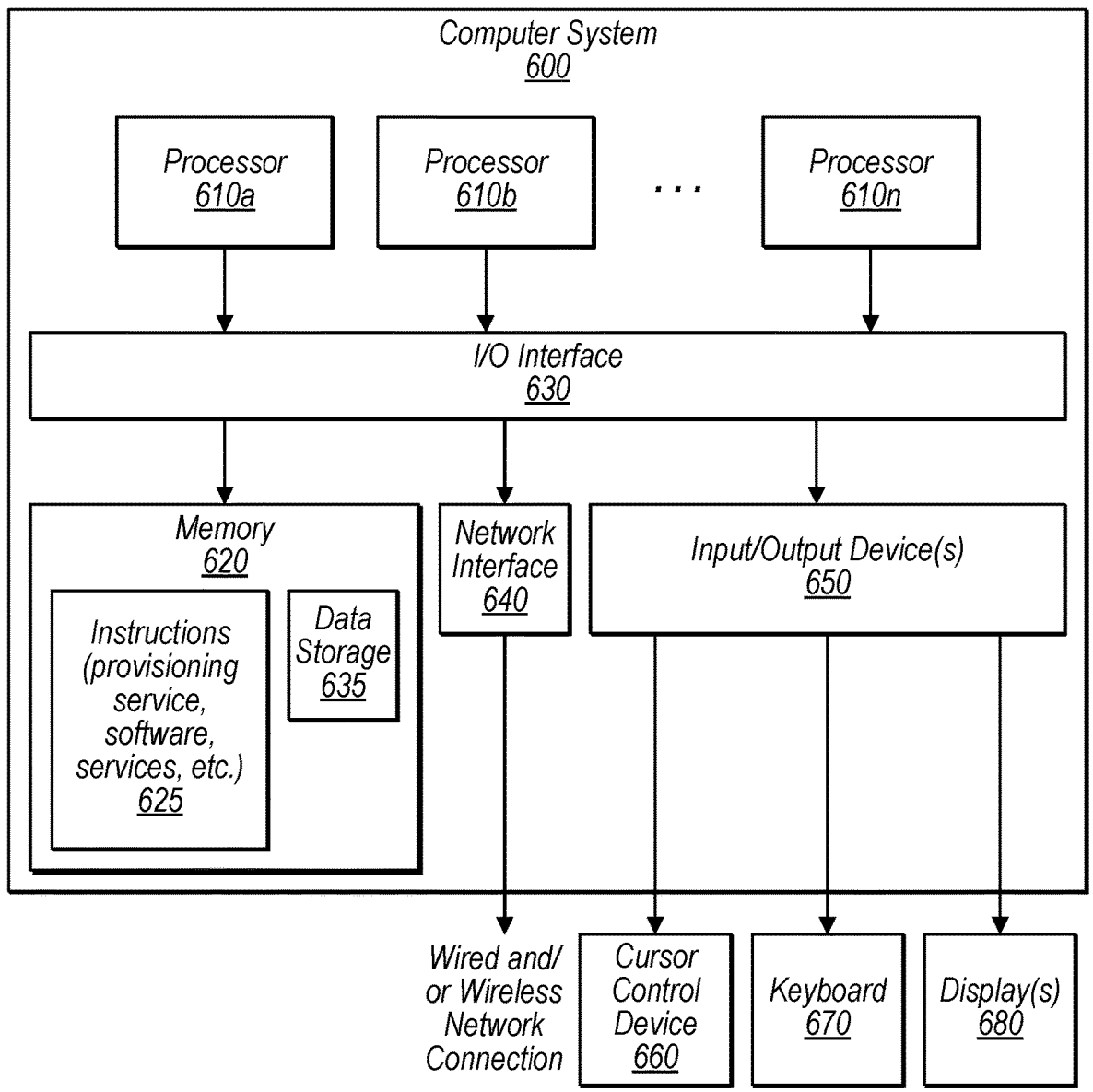
FIG. 6 is a block diagram illustrating an example computing system, according to some embodiments.

Embodiments to implement secure provisioning of an edge device using a fiducial marker as described herein may be executed on one or more computer systems, which may interact with various other systems or devices. One such computer system is illustrated by FIG. 6. In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. Display(s) may include standard computer monitor(s) and/or other display systems, technologies or devices, in one embodiment.

In some embodiments, it is contemplated that embodiments may be implemented using a single instance of computer system 600, while in other embodiments multiple such systems, or multiple nodes making up computer system 600, may host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions, in one embodiment. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms.

For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 620 may store program instructions 625 and/or data accessible by processor 610, in one embodiment. In various embodiments, system memory 620 may be implemented using any suitable memory technology, such as static random access memory (SRAM), synchronous dynamic RAM (SDRAM), nonvolatile/Flash-type memory, or any other type of memory.

In the illustrated embodiment, program instructions and data implementing desired functions, such as those described above (e.g., the provisioning service, other services, software, and any other components/devices, etc.) are shown stored within system memory 620 as program instructions 625 and data storage 635, respectively. In other embodiments, program instructions and/or data may be received, sent or stored upon different types of computer-accessible media or on similar media separate from system memory 620 or computer system 600.

A computer-accessible medium may include non-transitory storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640, in one embodiment.

In one embodiment, I/O interface 630 may be coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610).

In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor 610.

Network interface 640 may allow data to be exchanged between computer system 600 and other devices attached to a network, such as other computer systems, or between nodes of computer system 600, in one embodiment. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or retrieving data by one or more computer system 600, in one embodiment. Multiple input/output devices 650 may be present in computer system 600 or may be distributed on various nodes of computer system 600, in one embodiment. In some embodiments, similar input/output devices may be separate from computer system 600 and may interact with one or more nodes of computer system 600 through a wired or wireless connection, such as over network interface 640.

As shown in FIG. 6, memory 620 may include program instructions 625 that implement the various embodiments of the systems as described herein, and data store 635, comprising various data accessible by program instructions 625, in one embodiment. In one embodiment, program instructions 625 may include software elements of embodiments as described herein and as illustrated in the Figures. Data storage 635 may include data that may be used in embodiments (e.g., fiducial markers, registry, client certificates, credentials, software, etc.). In other embodiments, other or different software elements and data may be included.

Those skilled in the art will appreciate that computer system 600 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device.

Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-readable medium separate from computer system 600 may be transmitted to computer system 600 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors and one or more memories, wherein the one or more memories have stored thereon instructions, which when executed by the one or more processors, cause the one or more processors to implement a provisioning service for a plurality of clients of a provider network, wherein the provisioning service is configured to, for a given client:
generate a plurality of fiducial markers that respectively encode different security credentials and a network address, wherein the security credentials are one-time use credentials;
receive, from the client, input comprising a device identifier of an edge device to be used at a remote network of the client with a service of the provider network;
register the edge device with the provisioning service, wherein the provisioning service stores at least the device identifier;
receive, at the network address from the edge device of the client, the device identifier and decoded security credentials that were encoded in a fiducial marker of the plurality of fiducial markers and were subsequently decoded by the edge device to generate the decoded security credentials;
authenticate the edge device based on the decoded security credentials;
subsequent to the authentication of the edge device based on the decoded security credentials, expire the decoded security credentials; and
in response to the authentication of the edge device, provide, to the edge device, at least a unique client certificate for authentication of the edge device by one or more services of the provider network.

2. The system as recited in claim 1, wherein the provisioning service is further configured to:
in response to a determination that other security credentials that were encoded in another of the fiducial markers have not been used for a threshold amount of time, expire the other security credentials.

3. The system as recited in claim 1, wherein the provisioning service is further configured to:
in response to the authentication of the edge device, provide, to the edge device, configuration software for the device to connect to the one or more services.

4. The system as recited in claim 3, wherein the configuration software comprises a network address of the one or more services.

5. The system as recited in claim 1, wherein the provisioning service is further configured to, in response to the authentication of the edge device:
provide, to an endpoint, a request for the unique client certificate for the edge device; and
receive, from the endpoint, the unique client certificate.

6. A method, comprising:
performing, by one or more computing devices of a provider network:
generating a plurality of fiducial markers that respectively encode different security credentials;
receiving, from an edge device of a client, a device identifier of the edge device and decoded security credentials that were encoded in a fiducial marker of the plurality of fiducial markers and were subsequently decoded by the edge device to generate the decoded security credentials;
authenticating the edge device based on the decoded security credentials; and
in response to the authentication of the edge device, providing, to the edge device, at least a unique client certificate for authentication of the edge device by one or more services of the provider network.

7. The method as recited in claim 6, further comprising:
in response to the authentication of the edge device based on the decoded security credentials, expiring the decoded security credentials.

8. The method as recited in claim 6, further comprising:
in response to determining that other security credentials of another of the fiducial markers have not been used for a threshold amount of time, expiring the other security credentials.

9. The method as recited in claim 8, wherein the plurality of fiducial markers respectively encode a network address, and wherein the device identifier and the decoded security credentials are received at the network address.

10. The method as recited in claim 6, wherein the edge device has been registered with the provider network prior to receiving the device identifier from the edge device.

11. The method as recited in claim 6, further comprising:
receiving, from another edge device of a client, another device identifier of the other edge device and the decoded security credentials that were encoded in the fiducial marker, wherein the other edge device has been registered with the provider network prior to receiving the other device identifier from other the edge device;
determining that the decoded security credentials have been expired; and
in response to determining that the decoded security credentials have been expired, preventing authentication of the other edge device.

12. The method as recited in claim 6, further comprising:
receiving, from the client, a request for a status of the edge device; and
in response to receiving the request, providing, to the client, one or more of:
an indication that the edge device has established a connection with the provider network,
an indication that the edge device is being provisioned for use with the one or more services, or
an indication that the edge device has completed provisioning for use with the one or more services.

13. The method as recited in claim 6, further comprising:
in response to the authentication of the edge device, providing, to the edge device, configuration software for the device to connect to the one or more services.

14. The method as recited in claim 6, further comprising:
providing, to an endpoint, a request for the unique client certificate for the edge device; and
receiving, from the endpoint, the unique client certificate.

15. One or more non-transitory computer-accessible storage media storing program instructions that when executed on or across one or more processors of an edge device of a network of a client cause the one or more processors to:
detect, based on input from a camera of the edge device, a fiducial marker;
decode a network address and security credentials represented by the fiducial marker;
provide, to the network address of a remote provider network, a device identifier of the edge device and the decoded security credentials that were encoded in the fiducial marker and were subsequently decoded by the edge device to generate the decoded security credentials, wherein the edge device has been registered with the provider network prior to the providing of the device identifier to the network address of the remote provider network; and
receive, from the provider network, a unique client certificate for authentication of the edge device by one or more services of the provider network.

16. The one or more storage media as recited in claim 15, wherein the network address comprises a uniform resource locator (URL) of the provider network.

17. The one or more storage media as recited in claim 15, wherein the program instructions when executed on or across the one or more processors further cause the one or more processors to:
receive, from the provider network, configuration software for the device to connect to the one or more services; and
installing the configuration software.

18. The one or more storage media as recited in claim 17, wherein the configuration software comprises a network address of the one or more other services.

19. The one or more storage media as recited in claim 15, wherein the program instructions when executed on or across the one or more processors further cause the one or more processors to:
using the unique client certificate to establish a secure connection with one of the one or more other services of the provider network.

20. The one or more storage media as recited in claim 19, wherein the program instructions when executed on or across the one or more processors further cause the one or more processors to:
receive, from the other service, software;
install the software;
execute the software; and
send, to the other service, data based on the execution of the software.

* * * * *